Patented Mar. 31, 1942

2,277,821

UNITED STATES PATENT OFFICE 2,277,821

METHOD OF PREPARING HYDROXY-ALKYLOXYALKYL CYANAMIDES

Walter P. Ericks, Cos Cob, Conn., assignor to American Cyanamid Company, New York, N. Y., a corporation of Maine No Drawing. Application August 10, 1939, Serial No. 289,399

13 Claims. (Cl. 260—551)

This invention relates to a method of preparing hydroxyalkyloxyalkyl alkoxyalkylol cyanamides.

I have found that when two or more moles of a compound containing an ethylene oxide ring and one mole of an alkaline earth metal cyanamide are reacted together in an aqueous solution, there are obtained ether alcohol derivatives of cyanamide.

As a consequence of tautomerism the above type of compounds may occur in several isomeric forms. Possibly, two, three or even four of these isomers may coexist in a state of equilibrium. According to physical or chemical influence one of these isomers will predominate and I therefore designate the reaction product as a monomeric compound with an open chain structure of the following representative formula:

$$N{\equiv}C.NH.R.OH$$

in which R is an alkoxyalkyl group.

In practicing my invention an aqueous slurry of an alkaline earth metal cyanamide is prepared by introducing one mole equivalent of the cyanamide compound in small portions into water which is stirred rapidly. Two or more mole equivalents of a compound containing an ethylene oxide ring are then introduced slowly at atmospheric pressure into the agitated suspension which is maintained at a temperature not exceeding the boiling point of said compound. If desired the reaction may be carried out at elevated pressures in order that it may be completed in less time. The mixture is filtered. The filter cake containing the major portion of the alkaline earth metal as an insoluble is washed with water. A precipitant is added to the combined filtrate and washings to throw out the residual alkaline earth metal as a substantially insoluble compound which is filtered off. The alkoxyalkylol cyanamide is obtained from the filtrate after removing the water by evaporation. It is preferable to carry out the evaporation under reduced pressure of 10–20 mm. mercury, as in such case less time and lower evaporating temperatures are required.

This process is particularly adaptable to commercial operation in that I may utilize crude calcium cyanamide which is an inexpensive, plentiful cyanamide material. Crude calcium cyanamide known to the trade as cyanamid contains more than 60% calcium cyanamide. The remaining materials such as carbonate, hydroxide, free carbon, etc., are removed from the reacted slurry during filtration.

Precipitants such as carbon dioxide may be used to remove the residual alkaline earth metal compound from the filtrate. Other reactants such as oxalic acid, sulfuric acid and phosphoric acid which form substantially water-insoluble compounds with the alkaline earth metals are also available for this purpose. When employing either sulfuric or phosphoric acid as the precipitant such quantities of these materials are added until a pH of approximately 7.5 is reached and thereafter the remaining trace of alkaline earth metal is removed with carbon dioxide.

The volume of water to be evaporated from the filtrate is not excessively great because the alkoxyalkylol cyanamide formed in the course of reaction is easily soluble in water. Economy in size of equipment and time consumed lend to the simplicity of the process. The yield of the product in most cases is greater than 90% of the theory.

This invention will be illustrated in greater detail by the preparation of the compounds shown in the following examples. The materials employed are in parts by weight.

EXAMPLE 1

Ethoxy-ethylol cyanamide

This compound was prepared by the reaction of two moles of ethylene oxide with one mole of calcium cyanamide in an aqueous slurry.

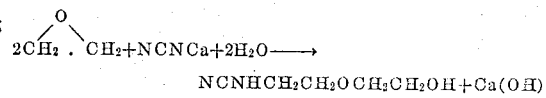

134 parts of cyanamid (60.6% NCNCa) were introduced in small portions into 500 parts of water which were stirred rapidly at a temperature not exceeding 25° C. The slurry was agitated for one hour and then cooled to about 5° C. 88 parts of ethylene oxide were introduced into the agitated slurry at such a rate that the reaction temperature was maintained below 10° C. The mixture was stirred for one hour and the temperature allowed to rise slowly to 25° C. After standing for several hours the mixture was filtered and the filter cake washed with water. Carbon dioxide was passed into the combined filtrate and washings to precipitate the residual calcium as carbonate which was filtered off. The filtrate was transferred to an evaporator and the water evaporated under reduced pressure of 10–20 mm. mercury. The product was a colorless viscous liquid.

EXAMPLE 2

*Triethoxy-ethylol cyanamide*

This compound was prepared by the reaction of four moles of ethylene oxide with one mole of calcium cyanamide in an aqueous slurry.

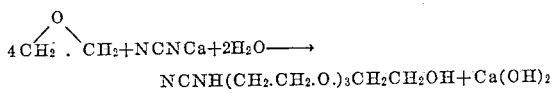

134 parts of cyanamid (60.6% NCNCa), 250 parts of water and 176 parts of ethylene oxide were placed in a pressure autoclave provided with heating and agitating means. The reaction cycle was as follows:

| Time, min. | Temperature | Pressure |
|---|---|---|
|  | ° C. | Lbs. per sq. in. |
| 5 | 30 | No pressure indicated. |
| 10 | 40 | Do. |
| 15 | 50 | 30. |
| 20 | 64 | 40. |
| 25 | 73 | 50. |
| 30 | 84 | 60. |
| 35 | 92 | 70. |
| 40 | 103 | 50. |
| 45 | 108 | 40. |
| 50 | 105 | 30. |
| 55 | 105 | 25–30. |
| 60 | 105 | 20–25. |
| 65 | 105 | 20–22. |
| 70 | 103 | 20 or less. |

The autoclave was slowly cooled to room temperature. The reacted mixture was filtered. The filter cake was washed with small portions of water. Carbon dioxide was passed into the combined filtrate and washings to precipitate the residual calcium as calcium carbonate which was filtered off. The filtrate was evaporated in an open pan until the water was removed. The product was a pale yellow oil-like liquid.

EXAMPLE 3

*Nonaethoxy-ethylol cyanamide*

This compound was prepared by the reaction of ten moles of ethylene oxide with one mole of calcium cyanamide in an aqueous slurry.

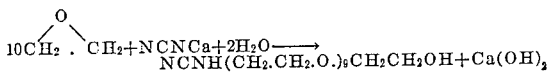

134 parts of cyanamid (60.6% NCNCa), 250 parts of water and 440 parts of ethylene oxide were placed in a pressure autoclave provided with heating and agitating means. During the reaction cycle a gradual rise in pressure took place until a temperature of 92° C. was reached. At this point a rapid rise in temperature occurred to a maximum of about 180° C. The charge was then slowly cooled to room temperature, filtered and the filter cake washed with water. The combined filtrate and washings were treated with carbon dioxide to precipitate the remaining calcium as calcium carbonate which was filtered off. The filtrate was transferred to an evaporator and the water evaporated under reduced pressure of 10–20 mm. mercury. The product was an amber colored oil-like liquid equal to approximately 98% of the theoretical yield.

EXAMPLE 4

*Tripropoxy-propylol cyanamide*

This compound was prepared by the reaction of four moles of propylene oxide with one mole of calcium cyanamide in an aqueous slurry.

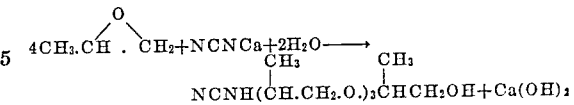

134 parts of cyanamid (60.6% NCNCa), 250 parts of water and 232 parts of propylene oxide were placed in a pressure autoclave provided with heating and agitating means. The charge was heated to a temperature of about 110° C. within a period of 80 minutes. After cooling to room temperature the reacted slurry was removed from the autoclave, filtered and the filter cake washed with small portions of water. Carbon dioxide was passed into the combined filtrate and washings to precipitate the residual calcium as carbonate. The mixture was filtered and the filtrate evaporated under reduced pressure of 10–20 mm. mercury until the water was removed. The product was a pale yellow oil-like liquid equal to 89.5% of the theoretical yield.

EXAMPLE 5

*Butoxy-butylol cyanamide*

This compound was prepared by reacting one mole of calcium cyanamide in an aqueous slurry with isobutylene oxide used in a quantity larger than that required by theory.

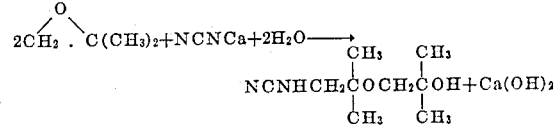

A slurry of 134 parts of cyanamid (60.6% NCNCa), in 500 parts of water was prepared using the procedure described in Example 1. 288 parts of isobutylene oxide were introduced slowly into the agitated slurry keeping the temperature below 25° C. After the isobutylene oxide had been added the mixture was stirred for two hours and the temperature allowed to rise to 40° C. The reacted mixture was then cooled to room temperature, filtered and the filter cake washed with small portions of water. Carbon dioxide was passed into the combined filtrate and washings to precipitate the remaining calcium as carbonate.

The mixture was agitated with 4 parts of charcoal, filtered and the filtrate evaporated in an open vessel until the water and the unreacted isobutylene oxide were removed. The unreacted isobutylene oxide which was used in excess of that required by theory can be recovered by fractional distillation. The product was a colorless viscous liquid equal to approximately 95% of the theoretical yield.

EXAMPLE 6

*Pentahydroxypropoxy-dihydroxy propyl cyanamide*

This compound was prepared by the reaction of six moles of glycidol

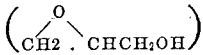

with one mole of calcium cyanamide in an aqueous slurry.

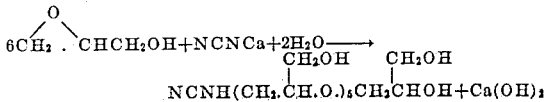

134 parts of cyanamid (60.6% NCNCa), 400 parts of water and 444 parts of glycidol were placed in a pressure autoclave provided with heating and agitating means. The charge was heated to a temperature of about 120° C. within a period of one hour. After cooling to room temperature the reacted slurry was removed from the autoclave, filtered and the filter cake washed with water. Carbon dioxide was passed into the combined filtrate and washings to precipitate the remaining calcium as carbonate. The mixture was filtered and the filtrate evaporated under reduced pressure of 10–20 mm. mercury. The product was an amber colored oil-like liquid equal to 98% of the theoretical yield.

Similarly other members of the alkoxyalkylol cyanamide series may be obtained by using as a starting material the corresponding compound containing a reactive ethylene oxide ring and a proper substituent in the ethylene ring, and reacting the same with an alkaline earth metal cyanamide.

The compounds prepared according to this invention are of particular utility in the formulation of coating and molding compositions, as textile assistants, as plasticizers, as emulsifying agents for oils and fats, as dispersing agents, and as starting materials for the synthesis of artificial fibres, laminated materials, resins, adhesives and other useful products.

Condensation products of the alkoxyalkylol cyanamides with organic monocarboxylic acids such as described in my copending application Ser. No. 278,456, filed June 10, 1939, are surface-active agents of the cation-active type; that is to say, their surface-active properties are due to the electro-positive portion of the molecule. For this reason they are well suited for wetting and softening wool, cotton, cellulose acetate, cellulose nitrate, viscose and similar threads and fabrics, as emulsifying agents for the preparation of emulsions of hydrocarbon oils, glyceride fats and oils and the like, as well as for demulsification of oil emulsions, in the formulation of printing inks, dye pastes, dye baths, as softeners for leather, as flotation agents, in the application of rubber latex emulsions to wool, cotton and rayon textiles, in preparing emulsions of resins and the like.

While the invention has been described with particular reference to specific embodiments, it is to be understood that it is not to be limited thereto but is to be construed broadly and restricted solely by the scope of the appended claims.

I claim:

1. A method of preparing hydroxy alkyloxy alkyl cyanamides which comprises reacting in an aqueous slurry one mole equivalent of an alkaline earth metal cyanamide with at least two mole equivalents of a compound containing a reactive ethylene oxide ring, removing insoluble materials, precipitating the alkaline earth metal present as a substantially insoluble compound and removing the same, and evaporating the water from the aqueous solution.

2. Method of claim 1 in which the initial reaction is carried out at a pressure substantially above atmospheric.

3. Method of claim 1 in which the evaporation is carried out at a pressure substantially below atmospheric.

4. A method of preparing hydroxy alkyloxy alkyl cyanamides which comprises reacting in an aqueous slurry one mole equivalent of calcium cyanamide with at least two mole equivalents of a compound containing a reactive ethylene oxide ring, removing insoluble materials, converting the calcium present to a substantially insoluble compound and removing the same, and evaporating the water from the aqueous solution.

5. A method of preparing hydroxy alkyloxy alkyl cyanamides which comprises reacting in an aqueous slurry one mole equivalent of calcium cyanamide and at least two mole equivalents of a compound containing a reactive ethylene oxide ring, removing insoluble materials, reacting the aqueous solution with carbon dioxide, removing the insoluble calcium carbonate and evaporating the water from the aqueous solution.

6. A method of preparing hydroxyethyl-nona-(oxyethyl) cyanamide which comprises reacting in an aqueous slurry one mole equivalent of an alkaline earth metal cyanamide and ten mole equivalents of ethylene oxide, removing insoluble materials, precipitating the alkaline earth metal present as a substantially insoluble compound and removing the same, and evaporating the water from the aqueous solution.

7. A method of preparing hydroxypropyl-tri-(oxypropyl) cyanamide which comprises reacting in an aqueous slurry one mole equivalent of an alkaline earth metal cyanamide and four mole equivalents of propylene oxide, removing insoluble materials, precipitating the alkaline earth metal present as a substantially insoluble compound and removing the same, and evaporating the water from the aqueous solution.

8. A method of preparing dihydroxypropyl-penta(oxyhydroxypropyl) cyanamide which comprises reacting in an aqueous slurry one mole equivalent of an alkaline earth metal cyanamide and six mole equivalents of glycidol, removing insoluble materials, precipitating the alkaline earth metal present as a substantially insoluble compound and removing the same, and evaporating the water from the aqueous solution.

9. A method of preparing hydroxyethyl-nona-(oxyethyl) cyanamide which comprises reacting in an aqueous slurry one mole equivalent of calcium cyanamide and ten mole equivalents of ethylene oxide under pressure at a temperature of about 180° C., removing insoluble materials, reacting the solution with carbon dioxide, removing the calcium carbonate and evaporating the water from the solution under reduced pressure of 10–20 mm. mercury.

10. A method of preparing hydroxypropyl-tri-(oxypropyl) cyanamide which comprises reacting in an aqueous slurry one mole equivalent of calcium cyanamide and four mole equivalents of propylene oxide under pressure at a temperature of about 110° C., removing insoluble materials, reacting the solution with carbon dioxide, removing the calcium carbonate and evaporating the water from the solution under reduced pressure of 10–20 mm. mercury.

11. A method of preparing dihydroxypropyl-penta(oxyhydroxypropyl) cyanamide which comprises reacting in an aqueous slurry one mole equivalent of calcium cyanamide and six mole equivalents of glycidol under pressure at a temperature of about 120° C., removing insoluble materials, reacting the solution with carbon dioxide, removing the calcium carbonate and evaporating the water from the solution under reduced pressure of 10–20 mm. mercury.

12. A method of preparing hydroxy alkyloxy alkyl cyanamides which comprises reacting in an aqueous slurry one mole equivalent of an alkaline earth metal cyanamide with at least two mole equivalents of a compound containing a reactive ethylene oxide ring, removing insoluble materials, precipating the alkaline earth metal present as a substantially insoluble compound and removing the same, evaporating the water from the aqueous solution, and maintaining the temperature at a point where all of the formed hydroxy alkyloxy alkyl cyanamide is not polymerized.

13. A method of preparing hydroxy alkyloxy alkyl cyanamides which comprises reacting in an aqueous slurry one mol equivalent of an alkaline earth metal cyanamide with at least two mol equivalent of a compound chosen from the group consisting of ethylene oxide, its homologs and glycidol, removing insoluble materials, precitipating the alkaline earth metal present as a substantially insoluble compound and removing the same, and evaporating water from the aqueous solution.

WALTER P. ERICKS.

CERTIFICATE OF CORRECTION.

Patent No. 2,277,821.   March 31, 1942.

WALTER P. ERICKS.

It is hereby certified that error appears in the printed specification of the above numbered patent requiring correction as follows: Page 1, first column, line 2, strike out "alkoxyalkylol"; and second column, line 37, in the formula, for "(OH)" read --$(OH)_2$--; and that the said Letters Patent should be read with this correction therein that the same may conform to the record of the case in the Patent Office.

Signed and sealed this 26th day of May, A. D. 1942.

Henry Van Arsdale,
Acting Commissioner of Patents.

(Seal)